United States Patent
Covino et al.

(10) Patent No.: US 8,468,228 B2
(45) Date of Patent: Jun. 18, 2013

(54) SYSTEM ARCHITECTURE METHOD AND COMPUTER PROGRAM PRODUCT FOR MANAGING TELECOMMUNICATION NETWORKS

(75) Inventors: Giuseppe Covino, Turin (IT); Danilo Gotta, Turin (IT); Marco Ughetti, Turin (IT)

(73) Assignee: Telecom Italia S.p.A., Milan (IT)

(*) Notice: Subject to any disclaimer, the term of this patent is extended or adjusted under 35 U.S.C. 154(b) by 93 days.

(21) Appl. No.: 10/568,688

(22) PCT Filed: Aug. 19, 2003

(86) PCT No.: PCT/IT03/00511
§ 371 (c)(1),
(2), (4) Date: Feb. 17, 2006

(87) PCT Pub. No.: WO2005/018249
PCT Pub. Date: Feb. 24, 2005

(65) Prior Publication Data
US 2006/0203732 A1  Sep. 14, 2006

(51) Int. Cl.
*G06F 15/173* (2006.01)
(52) U.S. Cl.
USPC ........... 709/223; 709/224; 709/200; 370/241; 370/282; 370/216
(58) Field of Classification Search
USPC ................................................. 709/223–226
See application file for complete search history.

(56) References Cited

U.S. PATENT DOCUMENTS

| | | | |
|---|---|---|---|
| 5,522,042 A * | 5/1996 | Fee et al. ...................... | 709/226 |
| 6,243,396 B1 | 6/2001 | Somers | |
| 6,259,705 B1 * | 7/2001 | Takahashi et al. ............ | 370/465 |
| 7,209,963 B2 * | 4/2007 | Burton et al. ................. | 709/223 |
| 7,225,250 B1 * | 5/2007 | Harrop .......................... | 709/224 |
| 2002/0032769 A1 * | 3/2002 | Barkai et al. ................. | 709/224 |
| 2004/0001449 A1 * | 1/2004 | Rostron et al. ............... | 370/282 |

FOREIGN PATENT DOCUMENTS

| | | |
|---|---|---|
| EP | 1 150 454 A2 | 10/2001 |
| EP | 1150454 * | 10/2001 |
| EP | 1 241 828 A1 | 9/2002 |
| WO | WO 01/02973 A1 | 1/2001 |

OTHER PUBLICATIONS

Hanaki, et al., "Cooperative ATM-LAN/WAN End-to-end Management Using CNM Interface", IEEE Global Telecommunications Conference, XP000737767, vol. 3, pp. 1455-1460, (Nov. 3, 1997).

(Continued)

*Primary Examiner* — Hua Fan
(74) *Attorney, Agent, or Firm* — Finnegan, Henderson, Farabow, Garrett & Dunner, L.L.P.

(57) ABSTRACT

A system architecture for managing a telecommunication network includes network equipment and supported network services, wherein the equipment has associated control interfaces. The architecture has a base layer proxying the interfaces and decoupling them from management functions, and a support layer having a community of agents co-ordinating operation of the base layer in order to support distributed management functionalities. The base layer and the support layer constitute separated superposed layers in the architecture. The layers in the architecture preferably include components adapted to perform respective functions based on respective instruction information provided to them. A data base is provided for storing the instruction information. The architecture is arranged for distributing the instruction information from the data base to the components. Preferably, all the layers in the architecture include process executors.

27 Claims, 9 Drawing Sheets

OTHER PUBLICATIONS

Figure 1:
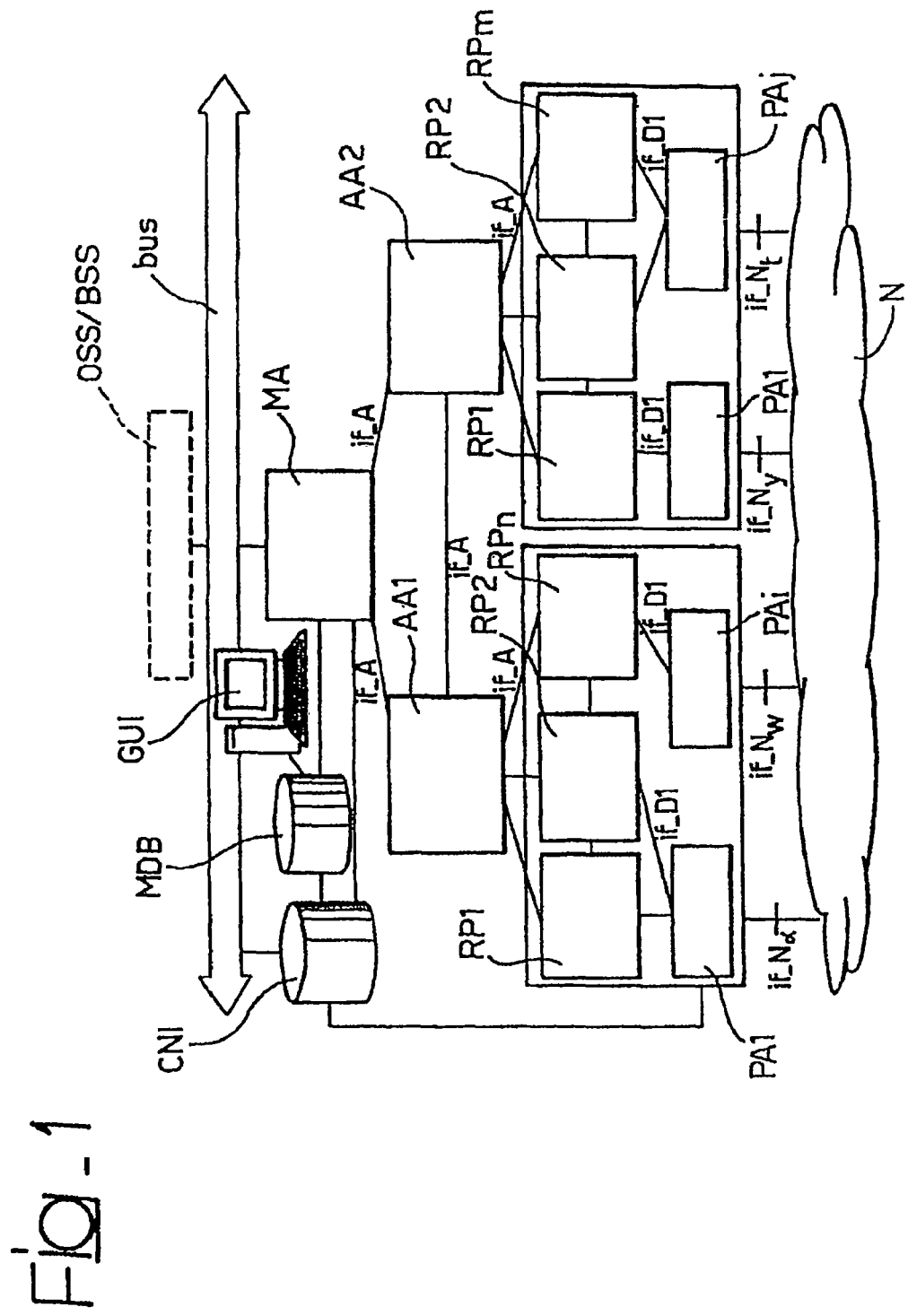

"Shared Information/Data (SID) Model", Concepts, Principles, and Domains, TeleManagement Forum, GB922, pp. 1-58, (Nov. 2004).
"The NGOSS Technology-Neutral Architecture", TMF 053, Public Evaluation, Version 3.0, pp. i-55, (Apr. 2003).
"The Common Information Model", Distributed Management Task Force, Technical Note, DMTF, CIM version 2.7, 3 pages, (2003).
Summons to attend oral proceedings pursuant to Rule 115(1) EPC, mailed Oct. 10, 2008, European Application No. EP 03 818 101.2.
David Hollingsworth, *Workflow Management Coalition the Workflow Reference Model*, Workflow Management Coalition, Document No. TC00-1003, Document Status—Issue 1.1 (Jan. 19, 1995).

* cited by examiner

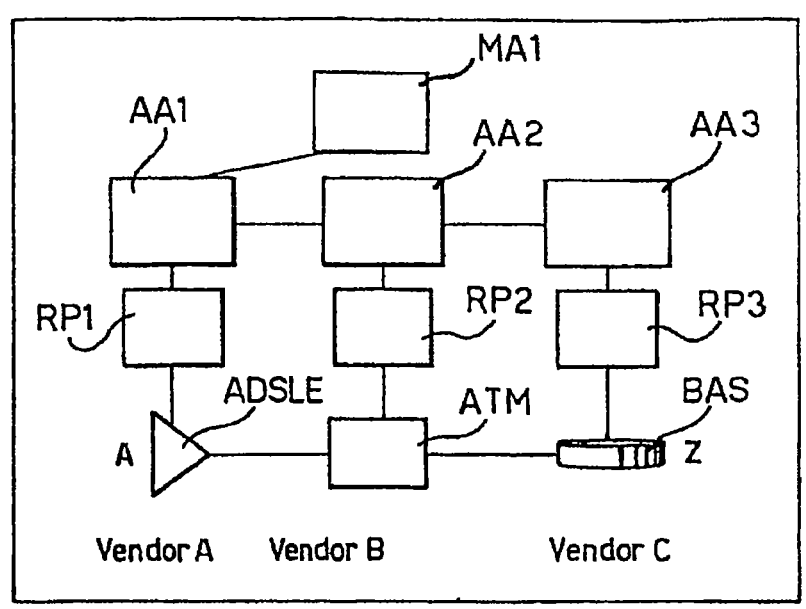

Fig_4
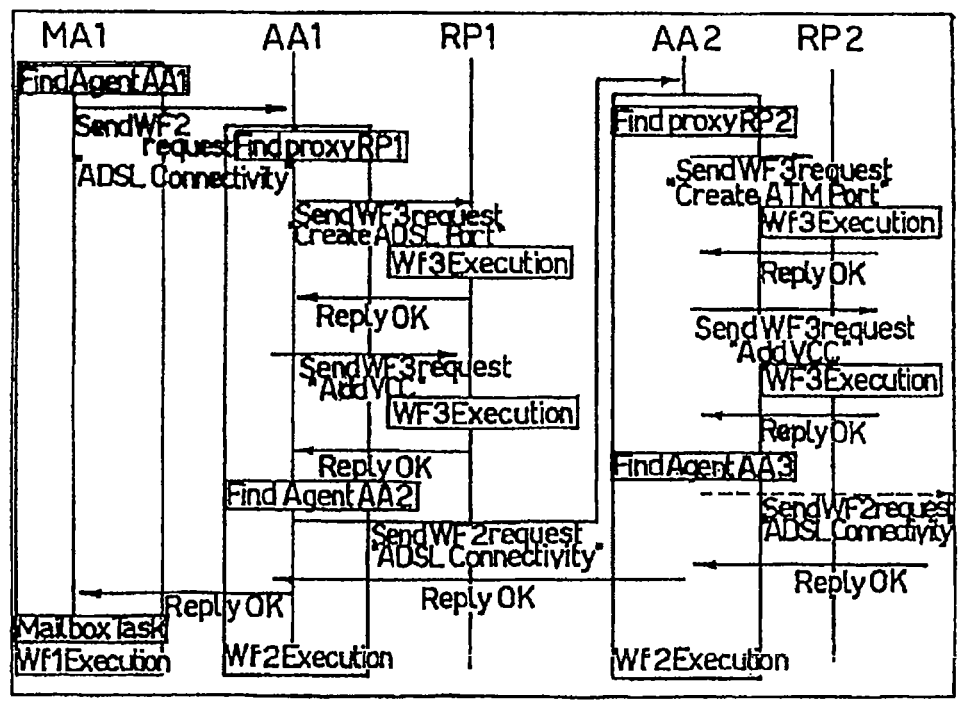
Fig_5
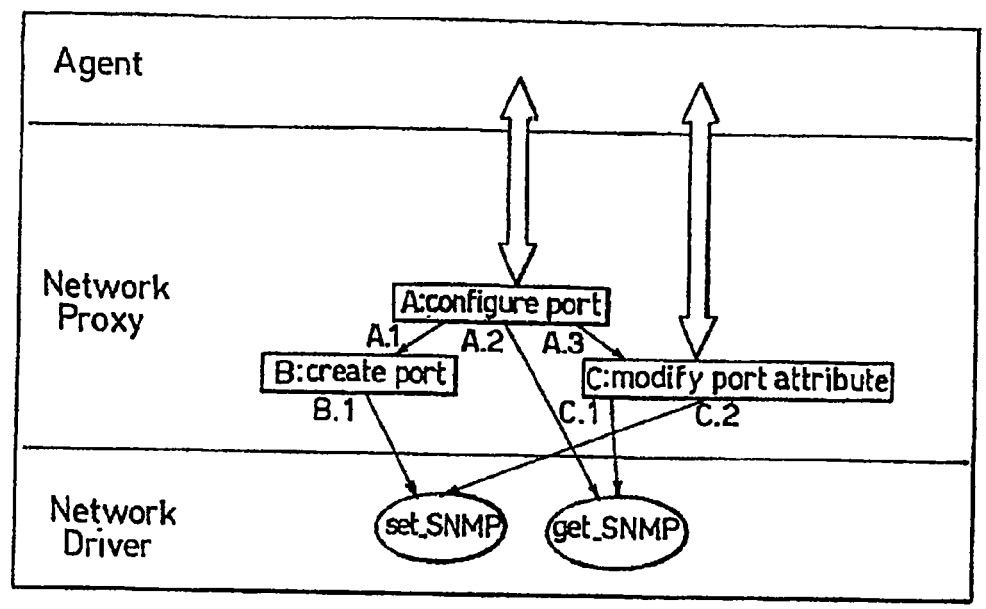

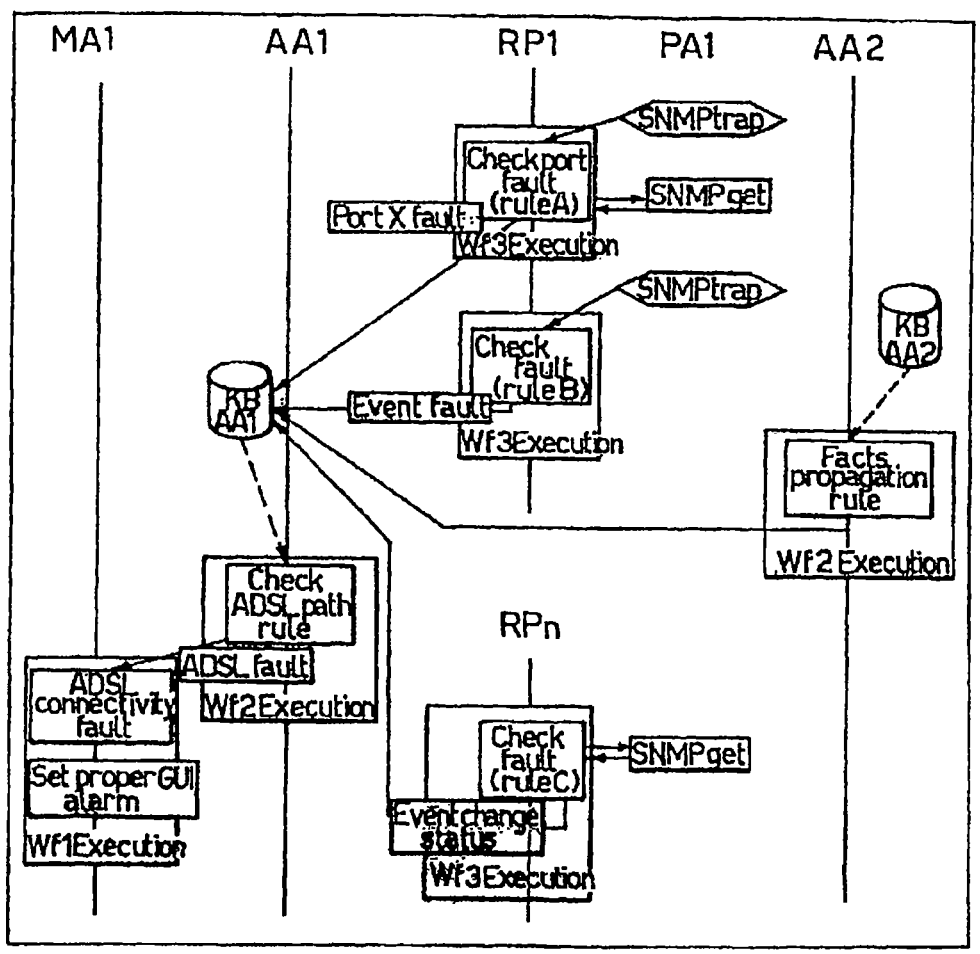
Fig_7

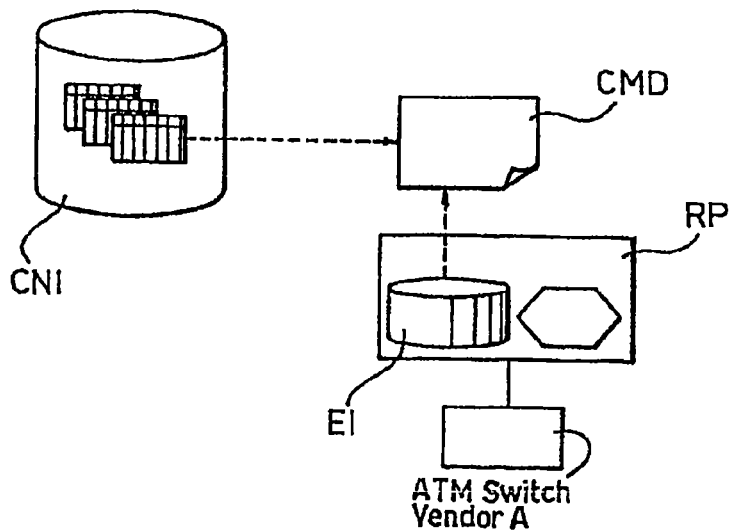
Fig_8
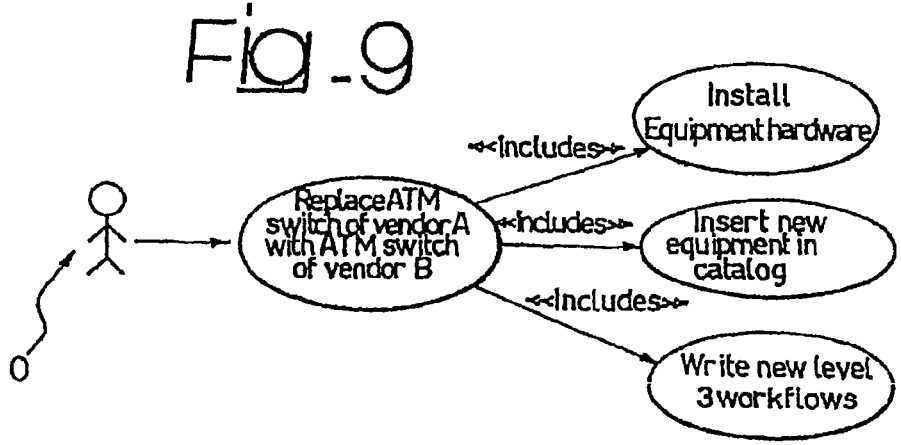
Fig_9

SYSTEM ARCHITECTURE METHOD AND COMPUTER PROGRAM PRODUCT FOR MANAGING TELECOMMUNICATION NETWORKS

CROSS REFERENCE TO RELATED APPLICATION

This application is a national phase application based on PCT/IT2003/000511, filed Aug. 19, 2003, the content of which is incorporated herein by reference.

FIELD OF INVENTION

The invention relates to architectures for managing telecommunication networks and to services and tools for use in those architectures.

DESCRIPTION OF THE RELATED ART

In conventional arrangements, management of telecommunication networks is carried out via separate systems/functionalities currently referred to as FCAPS (an acronym for Fault, Configuration, Accounting, Performance, Security). These are generally separate components exhibiting both poor flexibility and low scalability. Stated otherwise, in conventional arrangements, any addition/modification in the network managed entails corresponding additions/modifications to be carried out in each of the FCAPS.

Distributed network management platforms have thus been proposed in recent times that essentially implement multi-level hierarchical architectures of components (oftentimes called agents) and single-layer architectures.

For instance, U.S. Pat. No. 6,243,396 proposes a multi-layer architecture of authorities that includes agents. These agents are specialized for the various FCAPS functionalities as well as for representing network resources (proxy). This approach is quite flexible but fails to be truly satisfactory as regards the need of precisely identifying functionalities in the different layers and to avoid excessively layered structures likely to give rise to control and interfacing complexity. In brief, U.S. Pat. No. 6,243,396 does describe distributed and hierarchical agents exchanging goals. However, layers are not specified in their functions.

Another approach, involving a "flat" architecture, is disclosed in US2002/0032769 A1 and the corresponding EP-A-1 150 454. There, a network management system is disclosed that provides distributed task and data processing services by employing distributed autonomous agents. Specifically, the arrangement disclosed in these two parallel documents provides for certain components (again autonomous agents) holding a distributed representation of the network (proxy function) and support distributed FCAPS functionalities. This kind of architecture improves scalability but does not reach a truly satisfactory degree of flexibility. The proxy function and the management function are intrinsically intertwined with each other and some functionalities turn out to be difficult to implement efficiently in a distributed manner.

More generally, certain prior art network management platforms implement flexibility in the form of more or less sophisticated configuration capabilities and/or by offering development environments that help system designers or integrators to build the skeleton of new modules to support new services or new technologies.

This common degree of flexibility is known not to be satisfactory; arrangements have thus been proposed (see e.g. the TMF program designated NGOSS described e.g. in "NGOSS Technology Neutral Architecture", document TeleManagementForum TMF053 release 3.0, April 2003) wherein extraction of business process logic from components is recommended in order to have an external process engine that can orchestrate the flow of actions achieving a greater flexibility.

Process engines have also been proposed for use as workflow coordinators in distributed components each offering specific functionalities: see for example WO-A-01/02973 where the possibility is demonstrated of using a centralized workflow engine for coordinating distributed agents.

This approach improves flexibility only to a partial extent: a centralized process manager can become a bottleneck while a good deal of process logic remains embedded in the single components. This makes it impossible to concentrate in a process engine the functional aspects of all the components.

OBJECT AND SUMMARY OF THE INVENTION

The object of the present invention is thus to dispense with the intrinsic disadvantages of the prior art arrangements considered in the foregoing.

According to the invention, that object is achieved by means of system architecture having the features set forth in the claims that follow. The invention also relates to a corresponding method as well as computer program products loadable in the memory of at least one computer and comprising software code portions for performing the method of the invention. Reference to "at least one computer" is evidently intended to highlight the suitability for de-centralized implementation of at least part of the arrangement of the invention.

The arrangement described herein specifies a new platform for the distributed management of a telecommunication network and the services supported thereby as well as a manner for rendering the components very flexible and scalable.

The arrangement described herein solves the problems intrinsic in prior art arrangements by offering both centralized and distributed functionalities with agents arranged in a specific hierarchical structure by assigning precise functions to each layer. For instance, in a three-layer architecture each layer will have a specific task: a first layer will support centralized/coordination functionalities, the second layer will support the distributed functionalities and the third layer proxies the network with the aim of decoupling network interfaces from management functions.

The degree of flexibility of such an arrangement may be further improved by resorting to specific tools. These may involve, e.g.:

a) using combinations of workflow engines and rule engines in the components in all layers by establishing a distributed and hierarchical structure of workflow plus rule engines; the components will thus be fully "teachable" in terms of functionalities;

b) defining a model data base (MDB) that stores all process (workflows and rules) and data model definitions; this will provide a single point where the functions of the platform components will be defined in a centralized manner;

c) taking advantage of a) and b) by automatically distributing process and data model definitions across the platform; this will avoid the need of synchronizing the distributed hierarchical structure of engines.

The administrator of the platform will thus be in a position to generate any FCAPS functions by defining them in the data base, while the components involved will "learn" the new process definitions (workflow and rules) and run them when needed.

These processes can cover any FCAPS functionality, thus evolving from current platforms where each component runs a specific domain functionality (assurance, provisioning, performance, etc.) to platforms where each component can be freely "focused" (possibly run-time) on specific domain functionalities as required by current policies, availability of resources, load status, and so on.

The use of process engines does in fact boost the capabilities of a proxy layer as disclosed in EP-A-1 150 454. Extensive standardization activities on equipment models during the years (see e.g. the Common Information Model [CIM] technical note, DMTF, January 2003 or the "Shared Information Data Model Specification", document TeleManagement-Forum GB922 release 3.0, April 2003) have attempted to define flexible and extendible models. The arrangement described herein further develops these models by enabling modifications of those models without changing the code in the proxy.

By way of summary, the arrangement disclosed herein provides a fully satisfactory answer to five major issues that affect current platforms:

- a higher flexibility in supporting new services and modifications of existing services;
- a higher flexibility in supporting new network technologies including new types of equipment;
- higher and easier distribution of applications through code mobility;
- improved (e.g. more complete and real-time) alignment of network inventory with network status; and
- improved scalability and performance control of the new network and service management platform.

Significant and preferred architectural points in the presently preferred embodiment of the invention are the following:

- network and service management platform is provided based on distributed agents running 3-layer hierarchical workflow and rules engines;
- workflows and rules are used for not just coordinating of applications but also for implementing all the behavioral aspects of the components in the platform;
- a centralized model inventory (MDB) is made available for the definition and master storage of all process descriptions and network resource information models. These definitions are then distributed throughout the platform for use in the process engines that achieve automatic synchronization of all operating functionalities of the platform; the need is thus satisfied of having updated documentation of equipment modeling and operating processes continuously available; and
- a distributed network inventory layer (proxy) is provided that decouples the equipment from the operation support system (OSS) providing a fully synchronized database for all processes that need real-time documentation of the network.

BRIEF DESCRIPTION OF THE ANNEXED DRAWINGS

Figure 10:
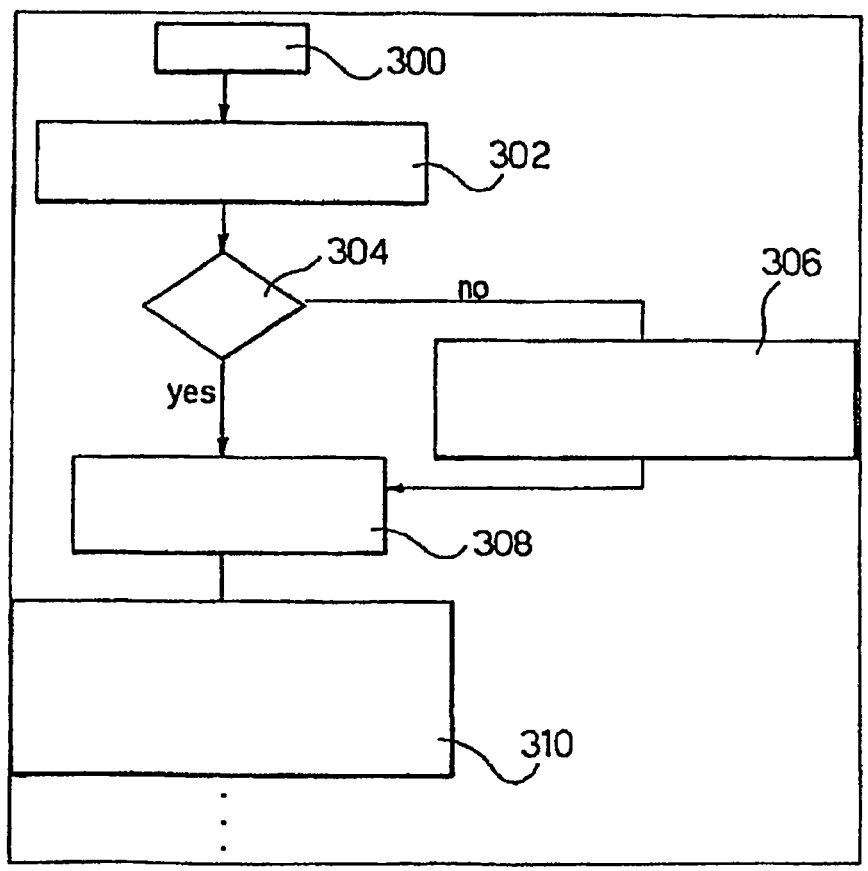
Figure 11:
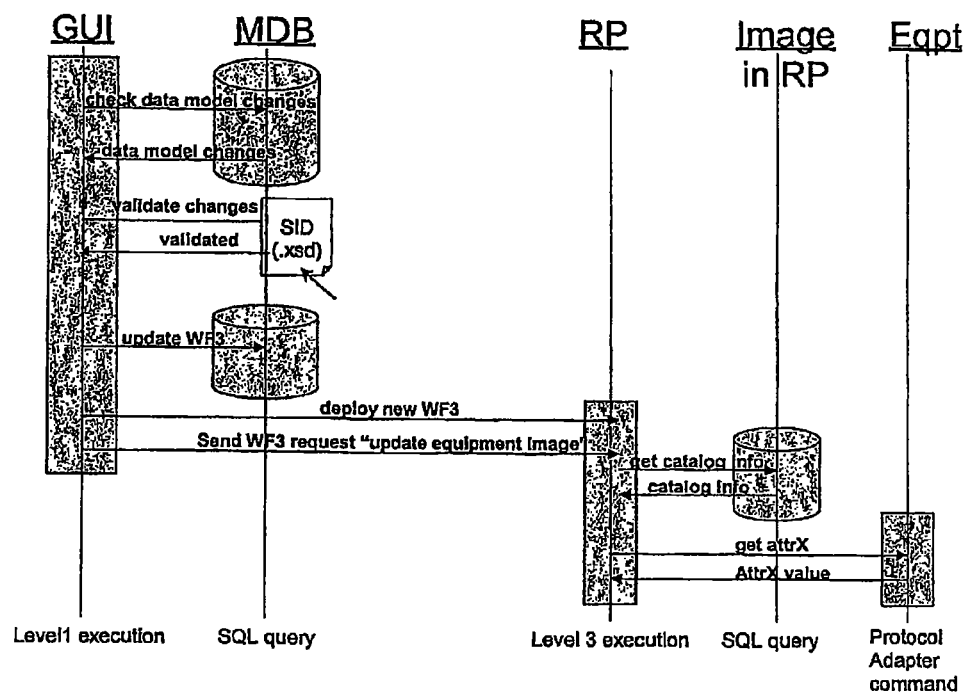

The invention will now be described, by way of example only, with reference to the annexed figures of drawing, wherein:

FIG. 1 is a block diagram showing the overall architecture of the arrangement shown herein, FIG. 2 is a block diagram showing a related provisioning scenario, FIG. 3, including two portions indicated a) and b), respectively, shows various examples of multilevel workflows, FIG. 4 depicts a typical activity diagram of an arrangement disclosed herein, FIG. 5 is an example of certain layer processes in the arrangement disclosed herein, FIG. 6, again including two parts designated a) and b), respectively, portrays various examples of multilevel workflow with exemplary rules for fault management, FIG. 7 shows another activity diagram within the framework of the arrangement disclosed herein, FIG. 8 portrays another scenario likely to arise within the framework of the arrangement described herein, FIG. 9 portrays an exemplary use case of an arrangement disclosed herein, FIG. 10 is a flow chart of workflows occurring within the arrangement disclosed herein, and FIG. 11 is another activity diagram related to the arrangement described herein.

DETAILED DESCRIPTION OF PREFERRED EMBODIMENTS OF THE INVENTION

In order to facilitate proper understanding of the principles underlying the invention, a number of basic definitions will now be provided of certain terms as used in describing the arrangement disclosed herein.

Agent: an agent is an independent and autonomous process with possible persistent state and requiring communication (e.g. collaboration or competition) with other agents in order to fulfill its tasks. This communication may be implemented through asynchronous message passing and by using well known languages (i.e. Agent Communication Language or ACL) with a well-defined and commonly agreed semantics.

Element Manager: in a network management environment this is an application that manages a number of network elements. Typically, the element manager is developed by the network element vendor and includes functionalities like: configuration, alarm monitoring and service provisioning.

OSS (Operations Support System): in a network management environment this is the application that is in charge of running tasks like trouble ticketing, billing, order management. Typically OSSs support the service and network management applications.

Network and service inventory: this is the system that stores and makes inventory information available to the other OSSs or management applications. The inventory information may include network and computing equipment, logical resources, topology and services. This (sub)system keeps track of the physical and topology configuration of the network, equipment inventory (cards, ports, etc.), physical and logical connectivity of the different network layers. A portion of the inventory, usually called "catalog", holds the descriptions of all entities stored in the inventory, both services and network entities. The Inventory keeps also track of planned, subscribed and provisioned services. Services are associated with the logical and physical network resources.

Manager application: this is an application running on a host and adapted to co-ordinate operation of one or more agents. It may include a graphical user interface (GUI) and is adapted to communicate with the distributed agents. For instance, it may distribute workflows, call the distributed agents to invoke an operation on a managed resource and perform administrative tasks.

Information model: this is the collection of information related to all managed objects. This information is preferably arranged in information types (or categories), each of these being in turn related to a given type of managed object (e.g. a personal computer, and so on). A managed object is one of any number of specific characteristics of a managed device. In a network management environment, managed devices are network elements and managed objects are entities like: cards, ports, physical and logical connections etc.

Proxy: a proxy object is a component mediating control of access to the actual object, for example a network element, on which a functionality lies.

Rule engine: a rule engine is a system for separating business rules (logically and/or physically) from the control logic and sharing them across data stores, user interfaces and applications. Once the rules are separated out and shared, the rule engine allows the users to modify them without making changes to other application modules. A rule engine is basically a sophisticated if/then statement interpreter. The if/then statements that are interpreted are called rules. The 'if' portions of the rules contain conditions such as 'item.price >$100'. The 'then' portions of the rules contain actions such as 'recommendDiscount(5%)'. The inputs to a rule engine are a rule set and some data objects. The outputs from a rule engine are determined by the inputs and may include the original input data objects with possible modifications, new data objects and side effects. A rule engine is used to decide, at runtime, which rules apply and how these are to be executed.

Workflow: a workflow is essentially the full or partial automation, e.g. of a business process, where documents, information or tasks are passed from one participant to another for action, according to a set of procedural rules. A workflow can be represented through a flowchart with a sequence of tasks and temporal and logical dependencies between tasks including alternative or parallel branches. A workflow can also be described as a finite state machine or with descriptive languages such as XPDL (XML Process Description Language).

Workflow engine: a workflow engine is the component in a workflow automation program that possesses all the information related to the procedures, steps in a procedure, and the rules for each step. The workflow engine determines whether the process is ready to move on to the next step. Briefly stated, a workflow engine is a component adopted for executing workflows.

As shown in the diagram of FIG. 1, the arrangement disclosed herein is based on an architecture including various types of components, namely:
 a collection of sets of resource proxies RP1, . . . , RPn; RP1 . . . , RPm with associated protocol adapters PA1, . . . PAi; PA1, . . . Paj,
 a collection of agent applications AA1, . . . AA2,
 a (logical) manager application—MA,
 centralized network inventory—CNI, and
 a model data base MDB.

As better detailed in the following, the architecture in question (or platform) is adapted for managing a telecommunication network N including network equipments (not shown in detail but of any known type).

These equipments have associated control interfaces such as those indicated as if_$N_\alpha$, if_$N_w$, if_$N_y$, if_$N_t$ in FIG. 1.

The resource proxies RP1, . . . , RPn; RP1 . . . , RPm and the associated protocol adapters PA1, . . . PAi; PA1, . . . Paj essentially comprise a base layer that proxies the interfaces if_$N_\alpha$, if_$N_w$, if_$N_y$, if_$N_t$ by decoupling them from management functions.

The agents AAs in turn comprise a community of agents that co-ordinate operation of the base layer (RA, RP) in order to support distributed management functionalities.

The base layer and the support layer constitute separated superposed layers in the architecture.

The data base MDB is the single (logical) point of definition and storage of all the behavioral and functional aspects of the platform, workflows, rules, information models and schemes. The platform automatically distributes these definitions to the platform components. The model data base is strictly linked to the catalog part of the network inventory system.

Being the source of all process and common data definition the MDB data base is inherently synchronized with the functionalities offered by the different components and the information models used to represent resources and services. This represents a major asset for the architecture operator who is not required to retrieve information from a huge amount of documentation provided by the different component vendors with the risk of failing to be aligned with all the operating components.

In the embodiment shown, processes are segmented into three layers with specific functions. This choice is intended to meet two needs: having the lowest possible number of layers (thus avoiding the complexity of conventional architectures) and allowing free allocation of processes between a distributed and a centralized implementation.

That implies the presence of a centralized layer 1 (that corresponds to the manager application MA), a fully distributed support layer 2 (that corresponds to the agent applications—hereinafter, briefly, AAs) plus one independent proxy layer 3 that decouples the network from the management platform. This segmentation also enables the provision of different service views, for example a business view by layer 1, a fulfillment view by layer 2 and an engineering view by layer 3. It will be appreciated that referring to the manager application MA and the layer comprised of the agent applications AAs does not exclude the possibility that the respective components may be at least partially arranged at the same geographical location.

Protocol adapters (hereinafter, briefly, PA) are typically arranged in sets, each set being responsible for interfacing all the network equipments of a designated area that offer the same application programming interface (API) protocol, for example SNMP (Simple Network Management Protocol), Telnet, TL1, etc. Each PA offers, as a service rendered to the resource proxies RP, execution of basic operations on the equipment; example of services for a SNMP protocol adapter are: get(parameters), set(parameters).

Each resource proxy (hereinafter, briefly, RP) is responsible for creating, maintaining and managing a so called "image" of a single equipment in the network N. The image is a representation of the configuration of the equipment according to a defined information model.

The alignment of the image to the network is effected in the following way:
 all the actions that the management platform performs on the network are actually done by RPs invoking operations through appropriate PAs;
 all the notifications (like alarms, traps) sent by the equipments are received by the proxies; that does not prevent equipments from sending notifications also to other destinations;
 periodic verification of alignment between the image of the equipment and the equipment itself is performed by the resource proxies (RPs).

The single equipment image can be enriched by element manager (EM) information such as e.g. inter-equipment information like topology, to give end-to-end view of services scattered across multiple equipments, and other information available on the EM.

Each RP runs processes typical of RP level using a process executor (PE): these processes may be defined "layer 3" processes and can be structured in sublayers. Processes at the top of layer 3 can be invoked externally, thus they are the services that each RP offers to the associated agent application(s) and to external applications. They represent the operations that can be performed atomically (thus as a single transaction) on the equipment that the RP manages.

Examples of services offered by the RP are: configure port, create cross-connection, modify connection attribute; each of these can include sequences of basic commands to be sent and/or received to/by the equipments.

Processes at the bottom of layer 3 use services offered by PAs. An example of a "layer 3" process is shown in FIG. 5.

The image handled by a RP is dynamically defined by the information model of the represented resource (e.g. a given network equipment). This model is defined by the GUI interface, stored in the data base MDB, then distributed by the manager application to the RPs. These load the model and finally instantiate it with values retrieved by the resource. Again the instantiation is performed in a flexible way using the PE.

In this manner changes and additions of information models (like version upgrade, new equipment introduction) do not require any appreciable software change in the platform components. This achieves a high degree of flexibility, insofar as the equipment API protocol is supported by the PA. Very slow evolution of protocols (SNMP, telnet) compared with high performance required from PAs makes using PE to implement PAs a less preferred choice.

As a fundamental component of the management platform, the network inventory CNI is arranged in two parts, namely: a distributed network inventory (DNI) and a centralized network inventory (CNI).

The former (i.e. the DNI) is the collection of all virtualizations (images) contained in all the RPs; it is used for all real-time or almost real-time tasks as provisioning, assurance, performance, control, and so on, where updated information on the configuration and state of the network is necessary for the accuracy and effectiveness of the task. These real-time tasks are difficult to perform by relying upon a logically centralized database, as is the case in current implementations of network inventory.

The latter part (i.e. the CNI) corresponds to the usual concept of a network inventory component. It is used for non real-time tasks where continuous updates are not possible for a centralized architecture. Example of such tasks are network design, network planning, capacity trend analysis.

The centralized network inventory is periodically updated retrieving information from the RPs.

Proxies can interact with one another directly for jobs that require simple inter-working. For example, in order to set up an end-to-end path, a given AA can use the topology information (which equipment is connected to which other) stored in the respective RPs.

Each AA is responsible for coordination of a respective set of RPs and for the execution of processes typical of the agent layer by using a PE. These processes must be executed in a distributed way and can be structured in sub-layers. Processes at the top of this "layer 2" can be externally invoked; thus these are the services that an AA offers to the manager application MA. These services are characterized by being vendor and technology independent, for example "create a DSL service", resulting into different sequences of actions whether the network technology is ADSL or VDSL and whether the vendor is vendor XX or vendor YY. Processes at the bottom of layer 2 use services (that is, invoke processes) offered by RPs.

Each AA does not require software update to support new services and technologies. This is due to the flexibility of the processes that are received by the manager application MA, loaded and executed by the AA layer.

AAs interact with one another via a community protocol (a messaging passing mechanism) to support distributed execution of management functionalities, for example distributed circuit design.

Each AA is responsible for local performance monitoring in order to inform the manager in respect of performance status.

The manager application MA is responsible for the following tasks:

managing the distribution of processes and the related information models of "layer 2" and "layer 3" from the MDB data base to the various AAs and RPs by retrieving the process definitions from the MDB data base;

monitoring the state of the platform with information provided by the AAs (and possibly the RPs), including distribution of components, domain management (partitioning of the whole network among the AAs), performance monitoring and consequent actions like re-distributing load among the AAs in order to achieve proper load balance;

interactions with external systems, like other operation support systems (OSSs) and billing support systems (BSSs);

execution of processes typical of the manager layer (as better detailed in the following).

Processes of such "layer 1" can be arranged in sub-layers and are characterized in order to provide functionalities that require interaction with external entities (other than AAs) or coordination among agents that cannot easily or efficiently be performed in a distributed way by AAs. The great flexibility of the architecture permits smooth evolution: for example, enhancement of the community protocol may enable migration of a process from layer 1 to layer 2.

Process executors for any layer are intended to be a workflow (a flowchart), a rule engine, or a combination of the two. For example, a provisioning process is better represented as a workflow while an alarm correlation is better represented as a combination of rules. This combination enables the administrator of the platform to set up any FCAPS functionality and let it evolve with a high degree of flexibility. Whenever possible and advisable, using workflows is preferred as this avoids the complexity of dealing with rule conflicts and rule management.

The process engines are embedded within the MAs, AAs and RPs; in fact an external location would entail remote invocations likely to produce performance degradations.

The various MAs, AAs and RPs show both a reactive and a proactive behaviour, as they are triggered on events but may also start processes.

Each of the AAs and the RPs as well as the MA can support any FCAPS functionality. That enables task-customization of components and reallocation based on task priority and resource needs, e.g. by allotting a majority of agents during daytime to service provisioning and a majority of agents during nighttime to network optimization.

Agent mobility is useful to move agent among machines in order to solve agent deployment as well as fault tolerance issues. If for any reason an agent "goes down", a new agent can be instantiated and moved toward another running machine in order to replace the non-available agent. The MA periodically monitors the presence of AA agents; if any of these "goes down" then MA may activate agent "resurrection" through mobility.

Agent mobility is also useful in order to move agents among machines in order to solve load balancing problem. This can occur when, for instance, an AA continuously checked by a MA to run a process, e.g. an ADSL activation process, becomes a bottleneck leading to operation slow-down. A new AA agent can be instantiated and moved either toward the machine where the overloaded AA agent runs (in order to distribute process invocations coming from the MA) or toward a machine with a lower CPU load.

The AA agent communicates the current load conditions to the MA, after which the MA executes the actions required e.g. by implementing agent mobility. The MA thus decides whether agents are to be moved or not, in order to keep control of agent dissemination.

The architecture described is thus intrinsically adaptive and can detect and predict saturation.

A preferred embodiment of the arrangement described herein uses JADE (Java Agent DEvelopment framework) for implementing agents with mobility features, the SID model (cited in the introductory portion of this description) to define the common model, BPML (Business Process Modeling Language) for process definition, and JESS (Java Expert System Shell) for PE implementation.

As a first example a three-layered provisioning scenario can be considered.

Specifically, FIG. 2 depicts the setup of a service provisioning scenario showing the achieved flexibility and scalability.

A broadband service "Offer 1" shall be delivered in a TLC network that includes access devices (ex. ADSL Equipment ADSL E), an ATM backbone and one or more broadband access servers BAS in order to achieve IP connectivity.

AA1, AA2, AA3 are the agents that manage, respectively:
the resource proxy RP1 that represents the image of the ADSL Equipment (i.e. the endpoint A of the end-to-end circuit),
the resource proxy RP2 that represents the image of the ATM switch connected to the ADSL Equipment, and
the resource proxy RP3 that represents the image of the BAS (i.e. the endpoint Z of the end-to-end circuit).

The multilevel workflows involved in the provisioning activity of the service "Offer 1" are shown in FIG. 3.

Specifically, the level 1 workflow (FIG. 3a, left) consists of two steps or tasks. The first one (ADSL connectivity, designated 100) is exploded into a level 2 workflow that is executed at the AA level while a mailbox task (generally designated 102 but not detailed in this example) can be performed by an external OSS platform.

Figure 3A:
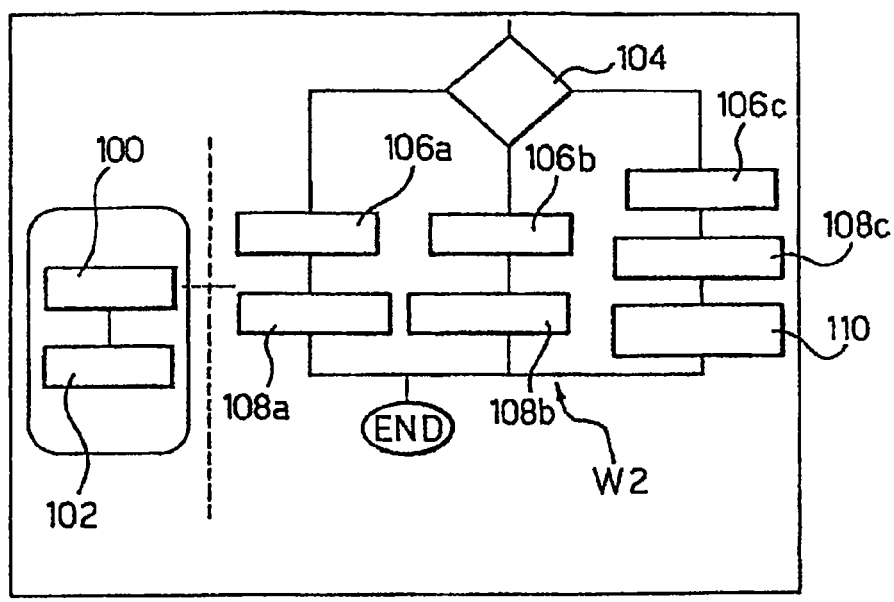
Figure 3B:
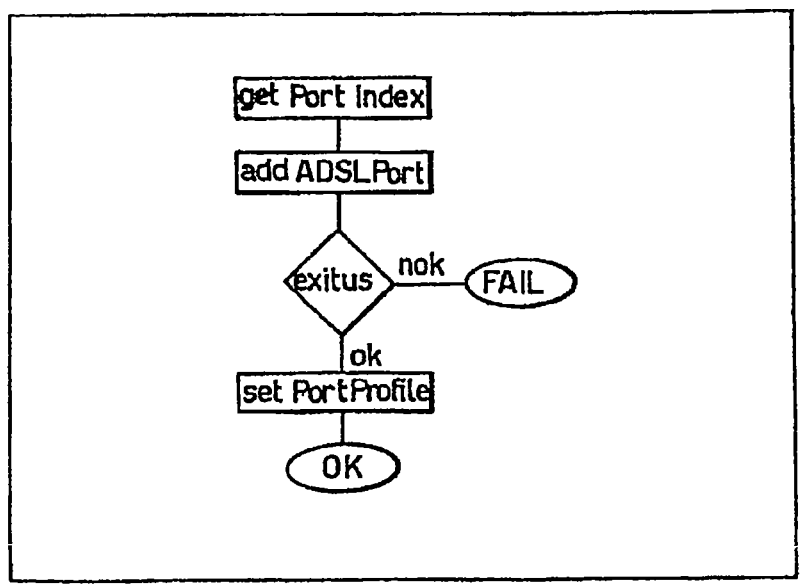

The ADSL connectivity task is thus a level 2 workflow W2 as detailed in the right-hand portion of FIG. 3a that consists of a sequence of level 3 workflows, technology and vendor dependent, that are executed at resource proxy level as detailed in FIG. 3b.

Specifically, reference 104 denotes a step leading to a choice among vendors A, B, and C providing the ADSL equipment, the ATM switch, and the BAS of FIG. 2, respectively. Steps 106a, 106b, 106c indicate the creation of respective ports for these vendors, that are subsequently provided respective virtual connections (VCC) in steps 108a, 108b, 108c. Step 110 designates the possible addition of an IP address to the VCC termination to Vendor C branch.

Finally, the level 3 workflows are sequences of the commands that must be performed on the equipment by the resource proxy through the suitable protocol adapters.

FIG. 4 shows the activity diagram of the various software components depicted in FIG. 2 except for the agent AA3 and the resource proxy RP3.

The actions "Find agent" and "Find Proxy" are performed by the manager application MA or the distributed components (application agent AA or resource proxy RP) on the basis of distributed circuit design algorithm not detailed in this invention (any well known path finding algorithms can be used to that purpose). These actions, performed through a strict collaboration among application agents and resource proxies are necessary in order to find the path between the endpoint A and the endpoint Z of the circuit to be provisioned.

This approach is very flexible as regards managing changes in each layer.

In fact, every change in the business view of the service is taken into account by just modifying in the MDB data base the layer 1 processes involved and moving them to the MA.

Every change in the network view of the service (e.g. some Vendor A ADSL equipment is substituted with Vendor D ADSL equipment) is taken into account by just modifying in the MDB data base the layer 2 processes involved (i.e. adding a new branch) and distributed by MA to the AAs.

Every change in the engineering view of the service (e.g. a firmware upgrade on a node) is taken into account by just modifying in the MDB data base the layer 3 processes involved.

In this scenario it is assumed that a protocol adapter suitable for the new equipment is already available.

As a second example the same arrangement described in the foregoing will be considered in the case of a fault scenario: the service "Offer 1" is assumed to be interrupted for some reasons, and a corresponding message is displayed on the MA console.

FIG. 6 illustrates an example of multilevel workflows mixed with rules engines that may cope with these circumstances.

Figure 6A:
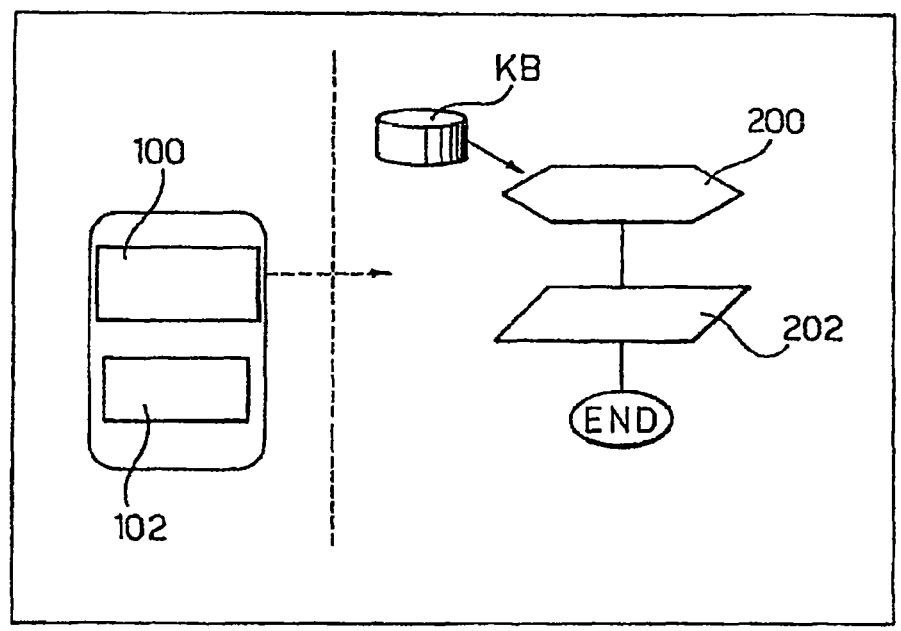
Figure 6B:
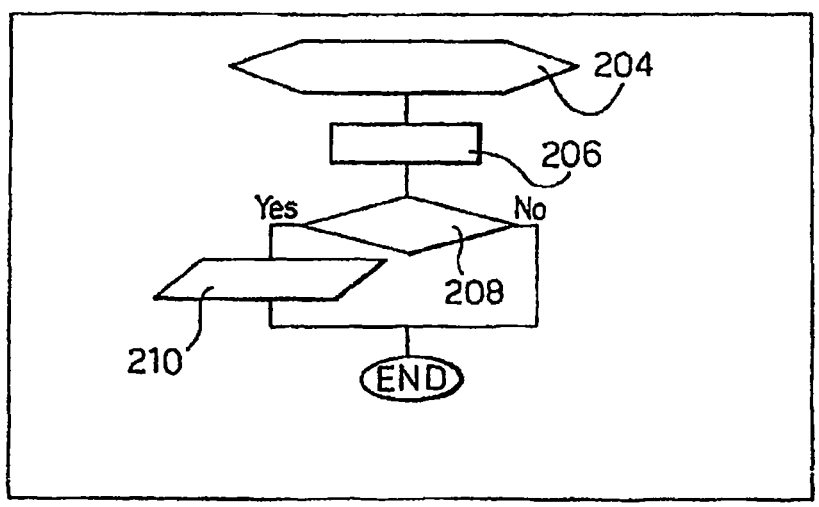

The level 1 process is again a workflow and requires that the alert message is displayed on a console of the MA when the ADSL connectivity 100 or the Mailbox sub-service 102 fails with additional information about fault reasons (see FIG. 6a, left).

The level 2 process (FIG. 6a, right) is rule-driven: the agent application KB (Knowledge Base) contains all relevant data (e.g. status of network resources, active alarms) collected from various events, from RPs but also from other AAs. The rule "Fault on ADSL path" is an example of alarm correlation (more precisely, fact correlation). For example, when the rule becomes true (step 200) it sends (in a step 202) a new event to the level 1 PE (inside the MA).

The level 3 Process (shown in FIG. 6b in the case of check port fault, e.g. the equipment of Vendor A) is again rule-driven: a rule is executed (step 204) as soon as RP receives an event from PA, like a SNMP trap. This rule gets more information on port status (step 206) through PA interoperation. After checking in step 208 if port status is operative, it alerts the AA, if necessary, in step 210.

FIG. 7 shows the activity diagram for the various platform components.

This case assumes that PA1 (a SNMP protocol adapter) receives a SNMP trap with information "Port X down" on a resource mirrored by RP1, along the ADSL path for "Offer 1" service. The rule engine on RP1 activates the rule "Check port fault", then propagates the event to AA1. AA1 accept event and stores it in KB.

Other events, in different order and times, can add facts in KB-AA1 from any RPs under AA1 scope (e.g. rule B and rule C). Facts in KB can raise rules in order to send events to other AA (e.g. from AA2 to KB-AA1), for inter-AA alarms correlation. When condition in AA1 rule "Check ADSL path"

becomes true, workflow is executed and a new event is sent to MA1, with information read from facts matched by the rule.

Finally, the workflow executed in MA1 causes an alarm like "Offer 1 service fault—link between RP1 and RP2 fault" to appear on a console connected to MA.

A main advantage of the arrangement shown lies the reduction of network traffic due to alarm signaling. Every component (RP, AA and also MA) takes part in alarms processing on different abstraction levels. In that way the alarm correlation function can be implemented (e.g. at the level of the agents AAs) very close to the possible alarm sources. This approach reduces network traffic due to alarms having to be sent to a central system. The flexibility inherent in workflows and rules definition permits the introduction of new equipment with minimal effort (same advantage described in provisioning case).

A third example highlights the flexibility of equipment management through level 3 workflow configuration.

This example bears witness to the flexibility in data model handling: after the addition of a new equipment type in a network, by just redefining (e.g. by means of a GUI adapted to manage in a user-friendly manner XML files, for example) the mapping model, the proxy layer automatically creates and maintains a synchronized representation of the new equipment, while operation of all the FCAPS functionalities is the distributed layer is never discontinued.

Specifically, this example is intended to show how the arrangement disclosed can flexibly and easily handle a data model change for an equipment with its vendor and technology dependent features. In summary, the process of replacing a Vendor A equipment with a Vendor B equipment requires only updating the data model (if changed) and modifying of level 3 workflow processes. The RPs are able to recognize the new equipment and utilize the new data model and level 3 workflows to populate the data model.

By way of example an ATM switch and the related scenario are shown in FIG. 8.

The common data model CMD (compliant with a common model like TMF's SID or DMTF's CIM) is specified using an XML schema file (xsd) stored in the MDB data base together with level 3 processes. The catalog data tables in the network inventory CNI hold the equipment catalog data (characteristic information needed to describe the network resources, often referred also as "metadata" or "templates"). The resource proxy RP represents the ATM Switch equipment of a vendor "A". It holds the image EI of the ATM Switch equipment. Both the catalog data and the equipment image are validated using the common data model specified in the xsd file.

The data model example considers the case depicted in FIG. 9. An operator O needs to replace an ATM switch of Vendor "A" with an ATM switch of Vendor "B"

This process includes a number of subtask that the operator O must carry out.

A first subtask is to install the hardware equipment: this task deals with the physical installation of the new piece of equipment.

A second subtask is to insert the new equipment in the catalog. Users have to insert the new equipment characteristic into the catalog (e.g. the new vendor name). It is assumed that the common catalog data are stored in a centralized network Inventory (CNI) OSS.

A third subtask is to rewrite the level 3 workflows. This is necessary in order to be able to manage the new equipment (using the new vendor dependent equipment commands) and to deal with the new equipment image (by means of the proper new commands to fill the Resource proxy memory image).

A portion of the level 3 workflows, involved in the resource proxy data model management, is shown in FIGS. 10. The workflow portions shown deal with the management of equipment card data.

The workflows in question contain the following type of commands:

Equipment command: vendor dependent equipment commands performed by the Resource proxy through the suitable protocol adapters (e.g. get card A or get card B—step 300).

CNI command: the commands performed on the CNI (e.g.: inventory.getCatalogInfo( . . . )—step 302) in order to query catalog information;

Resource proxy Image command: commands performed by the Resource proxy to update (or create) its equipment image (e.g.: image.setAttribute( . . . )—step 310).

Following a check (step 304) as to the availability in the proxy image of an object representing a card (if not, the object being created in step 306), the workflow portion allows getting the various card attributes (named Attribute1, Attribute2, Attribute3) values from the equipment (step 308) and then to update (in a step 310) the resource proxy image with the values retrieved.

The vendor dependent equipment differences affect the level 3 workflow. Indeed, the new Vendor B equipment card (Card B) contains only one attribute (named Attribute X). Therefore, the new workflow can be represented again with FIG. 10 where step 308 and 310 contain commands to get only attribute X value from equipment and update the RP image consequently.

The XML code below shows an XML version, compliant to the common data model, of the resource proxy image subsequent to the execution of the level 3 workflow for the vendor A equipment.

```
<Card id="ID2333" name="Card A">
    <AdditionalAttribute name="Vendor" value="A"/>
    <AdditionalAttribute   name="Attribute   1"
value="111"/>
    <AdditionalAttribute   name="Attribute   2"
value="222"/>
    <AdditionalAttribute   name="Attribute   3"
value="333"/>
    <PhysicalPort id="ID1" name="Port A">
        <AdditionalAttribute   name="Attribute   1"
value="111"/>
        <AdditionalAttribute   name="Attribute   2"
value="222"/>
        <AdditionalAttribute   name="Attribute   3"
value="333"/>
    </PhysicalPort>
    <PhysicalPort id="ID2" name="Port B">
        <AdditionalAttribute   name="Attribute   1"
value="aaa"/>
        <AdditionalAttribute   name="Attribute   2"
value="bbb"/>
        <AdditionalAttribute   name="Attribute   3"
value="ccc"/>
    </PhysicalPort>
</Card>
```

The further XML code below shows an XML version, compliant to the common data model, of the resource proxy image subsequent to the execution of the level 3 Workflow for the vendor B equipment.

```
<Card id="ID4503" name="Card B">
    <AdditionalAttribute name="Vendor" value="B"/>
    <AdditionalAttribute   name="Attribute   X"
```

```
            value="XXX"/>
        <PhysicalPort id="ID1" name="Port A">
            <AdditionalAttribute      name="Attribute    X"
    value="111"/>
        </Physical Port>
        <PhysicalPort id="ID2" name="Port B">
            <AdditionalAttribute      name="Attribute    X"
    value="aaa"/>
        </PhysicalPort>
        <PhysicalPort id="ID3" name="Port C">
            <AdditionalAttribute      name="Attribute    X"
    value="yyy"/>
        </PhysicalPort>
    </Card>
```

FIG. 11 shows the activity diagram of the various platform components involved in the resource proxy data model management. The GUI is intended to be the graphical user interface used by a human operator to work on the MDB and to control the MA. "Eqpt" stands for the equipment "ATM switch".

New equipment with their vendor dependent features is thus managed in a flexible and simple way. For example, the process of replacing a Vendor A equipment with a vendor B equipment involves only the configuration of the network inventory catalog data and of the new level 3 workflow. The agents are able to recognize the new equipment in the catalog and the associated new level 3 workflow and to use these to manage the new equipment and its resource proxy image.

The arrangement described can be extended for a number of layers greater than three, where the agent layer can be structured in a hierarchy. Preferably, the proxy layer is not split in order to avoid introducing bottlenecks in the network interactions; also, evolution of equipment may result in the proxy layer being arranged in the equipments, when they will offer standard interfaces with a unified data model. If all functionalities can be implemented as distributed, a separate manager/coordinator layer can be dispensed with by promoting some agents to external communication tasks.

It is thus evident that, the basic principles of the invention remaining the same, the details and embodiments may widely vary with respect to what has been described and illustrated purely by way of example, without departing from the scope of the presented invention as defined in the annexed claims.

The invention claimed is:

1. A storage device comprising a non-transitory, computer-readable network management system for managing a communication network comprising network equipment, said equipment having associated interfaces, the network management system comprising:

a base layer for proxying said interfaces and for decoupling said interfaces from management functions, said base layer comprising distributed process executors to execute in a distributed manner processes concerning management of said network, each process executor comprising at least one of a workflow engine, a rule engine, and a combination thereof;

wherein said base layer comprises:

a sub-layer of protocol adapters for interfacing a set of network equipment offering a given protocol; and a sub-layer of resource proxy modules, each said proxy module providing a representation of the configuration of given network equipment according to a defined information model and configured for aligning said representation of the configuration of given network equipment by at least one operation selected from the group of:

performinq all the management actions on said network by invoking operation through at least one associate protocol adapter;

receiving at said resource proxy modules all the notifications sent by said network equipment; and performing a periodical verification of alignment between the representation of the network equipment and said network equipment;

a support layer superposed to said base layer and comprising a plurality of agents coordinating operation of said base layer in order to support distributed management functionalities;

a database, stored on a computer-readable medium, storing instruction information; and a manager application configured to manage distribution of said instruction information from said database to at least one of said base layer and said support layer, wherein said distributed management functionalities include FCAPS (Fault, Configuration, Accounting, Performance, Security) functionalities, wherein at least two of said agents are hosted on different machines, wherein said layers are configured to perform respective functions based on said instruction information, wherein said layers are configured to modify respective functions in response to said instruction information, wherein said plurality of agents communicate information indicative of a status of said plurality of agents to said manager application, said information indicative of a status comprising information regarding current load conditions, and wherein, in response to said status information, said manager application moves at least one agent to a different machine.

2. The storage device of claim 1, wherein said resource proxy modules are configured for enrichment with element manager information.

3. The storage device of claim 1, wherein said resource proxy modules are configured for running processes using said process executors.

4. The storage device of claim 1, wherein said resource proxy modules are configured for interacting directly with one another in an interworking relationship.

5. The storage device of claim 1, wherein said agents in said community are configured for running vendor and technology independent services.

6. The storage device of claim 1, comprising at least one manager application configured for performing functions selected from the group of:

managing distribution of processes between said base layer and said support layer;

managing distribution of information models between said base layer and said support layer;

monitoring the state of the system on the basis of information provided by said agents;

interacting with external systems; and executing management processes.

7. The storage device of claim 6, wherein said at least one manager application comprises a separated, additional upper layer in said system.

8. The storage device of claim 6, wherein said at least one manager application is at least partly integrated to said support layer.

9. The storage device of claim 1, wherein all said layers in said system include process executors.

10. The storage device of claim 9, wherein each of said process executors in each of said layers comprises at least one of a workflow engine, a rule engine and a combination thereof.

11. The storage device of claim 1, wherein said instruction information comprises at least one of:
process definitions comprising at least one of workflows and rules; and
data model definitions.

12. The storage device of claim 1, wherein the manager application is configured to manage distribution of information models between said base layer and said support layer, said database being associated with the manager application.

13. The storage device of claim 1, wherein said resource proxy modules can support FCAPS (Fault, Configuration, Accounting, Performance, Security) functionalities.

14. A method of managing a communication network comprising network equipment, said equipment having associated interfaces, the method comprising the steps of:
providing a base layer proxying said interfaces and decoupling said interfaces from management functions;
executing, in said base layer, distributed processes concerning management of said network, each of said processes comprising at least one of workflows, rules, and combination thereof;
providing a sub-layer of protocol adapters for interfacing a set of network equipment offering a given protocol;
providing a sub-layer of resource proxy modules, each said proxy module providing a representation of the configuration of given network equipment according to a defined information model;
configuring said resource proxy modules for aligning said representation to the network of a given network equipment by at least one operation selected from the group of:
performing all the management actions of said network by invoking operation through at least one associated protocol adapter;
receiving at said resource proxy modules all the notifications sent by said network equipment; and
performing a periodical verification of alignment between the representation of the network equipment and said network equipment;
supporting distributed management functionalities via a support layer superposed to said base layer and comprising a plurality of agents coordinating operation of said base layer;
including FCAPS (Fault, Configuration, Accounting, Performance, Security) functionalities as said distributed management functionalities;
hosting at least two of said agents on different machines;
performing in each of said layers, functions based on instruction information;
providing a database for storing said instruction information for each of said layers;
distributing said instruction information from said database to each respective layer;
modifying at least one of the distributed processes based on said instruction information, such that a function of the at least one distributed process is changed;
providing a manager application configured for distributing said instruction information from said database to at least one of said base layer and said support layer;
providing information indicative of a status of said plurality of agents to said manager application, wherein said information indicative of a status comprises information regarding current load conditions; and
based on said information indicative of a status, moving at least one agent to a different machine.

15. The method of claim 14, further comprising the step of configuring said resource proxy modules for enrichment with element manager information.

16. The method of claim 14, further comprising the step of configuring said resource proxy modules for running processes using a process executor.

17. The method of claim 14, further comprising the step of configuring said resource proxy modules for interacting directly with one another in an inter-working relationship.

18. The method of claim 14, further comprising the step of configuring said agents in said community for running vendor and the technology independent services.

19. The method of claim 14, wherein the step of providing a manager application further comprises performing steps selected from the group of:
managing distribution of processes between said base layer and said support layer;
managing distribution of information models between said base layer and said support layer;
monitoring the state of said layers on the basis of information provided by said agents;
interacting with external systems; and
executing management processes.

20. The method of claim 19, further comprising the step of configuring said manager application as a separated upper layer in addition to said base proxying layer and said support layer.

21. The method of claim 19, further comprising the step of at least partly integrating to said support layer said manager application.

22. The method of claim 14, further comprising the step of providing process executors in all said layers.

23. The method of claim 22, further comprising the step of providing in said process executors at least one of a workflow engine, a rule engine, and combinations thereof.

24. The method of claim 14, further comprising the step of providing in said instruction information at least one of:
process definitions comprising at least one of workflows and rules, and
data model definitions.

25. The method of claim 14, further comprising the steps of:
providing said manager application configured for managing distribution of information models between said base layer and said support layer; and
associating said database with said manager application.

26. The method of claim 14, further comprising supporting FCAPS (Fault, Configuration, Accounting, Performance, Security) functionalities via said resource proxy modules.

27. A computer program product resident on a non-transitory computer-readable medium for storing instructions for execution by a processor, the instructions when executed by a processor performing a method of managing a communication network comprising network equipment, said equipment having associated interfaces, the method comprising:
providing a base layer proxying said interfaces and decoupling said interfaces from management functions;
wherein said base layer comprises:
a sub-layer of protocol adapters for interfacing a set of network equipment offering a given protocol; and
a sub-layer of resource proxy modules, each said proxy module providing a representation of the configuration of given network equipment according to a defined information model and configured for aligning said representation of the configuration of given network equipment by at least one operation selected from the group of:
- performing all the management actions on said network by invoking operation through at least one associate protocol adapter;
- receiving at said resource proxy modules all the notifications sent by said network equipment; and
- performing a periodical verification of alignment between the representation of the network equipment and said network equipment;

executing, in said base layer, distributed processes concerning management of said network, each of said processes comprising at least one of workflows, rules, and a combination thereof;

supporting distributed management functionalities via a support layer superposed to said base layer and comprising a plurality of agents coordinating operation of said base layer, wherein at least two of said agents are on different machines;

providing a database for storing instruction information for each of said layers;

distributing said instruction information from said database to each respective layer;

receiving instruction information in each of said layers;

performing in each of said layers, functions based on said instruction information;

receiving information indicative of a status of said plurality of agents, wherein said information indicative of a status comprises information regarding current load conditions; and based on said information indicative of a status, moving at least one agent to a different machine.

* * * * *